(12) United States Patent
Arora et al.

(10) Patent No.: US 9,396,284 B2
(45) Date of Patent: Jul. 19, 2016

(54) METHOD AND SYSTEM FOR IMPLEMENTING EFFICIENT UPDATABLE RELATIONAL VIEWS OVER XML DATA

(75) Inventors: Vikas Arora, San Mateo, CA (US); Thomas Baby, Auburn, WA (US); Zhen Hua Liu, San Mateo, CA (US); Qin Yu, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 65 days.

(21) Appl. No.: 13/110,671

(22) Filed: May 18, 2011

(65) Prior Publication Data

US 2012/0296942 A1 Nov. 22, 2012

(51) Int. Cl.
*G06F 17/30* (2006.01)

(52) U.S. Cl.
CPC .... *G06F 17/30926* (2013.01); *G06F 17/30932* (2013.01)

(58) Field of Classification Search
CPC .................................. G06F 17/30; G06F 17/00
See application file for complete search history.

(56) References Cited

U.S. PATENT DOCUMENTS

| | | | |
|---|---|---|---|
| 6,636,845 B2 * | 10/2003 | Chau ................. | G06F 17/30917 |
| 6,643,633 B2 * | 11/2003 | Chau ................. | G06F 17/30917 |
| 7,013,311 B2 * | 3/2006 | Hui .................... | G06F 17/30923 707/760 |
| 7,120,645 B2 * | 10/2006 | Manikutty ......... | G06F 17/30917 |
| 7,127,469 B2 * | 10/2006 | Lindblad et al. | |
| 7,174,327 B2 * | 2/2007 | Chau ................. | G06F 17/30917 |
| 7,350,192 B2 * | 3/2008 | Seitz et al. ....................... | 717/108 |
| 7,386,568 B2 * | 6/2008 | Warner et al. | |
| 7,499,909 B2 * | 3/2009 | Liu et al. | |
| 7,519,577 B2 * | 4/2009 | Brundage et al. | |
| 7,680,767 B2 * | 3/2010 | Adya ................ | G06F 17/30457 707/999.002 |
| 7,685,137 B2 * | 3/2010 | Liu et al. ..................... | 707/999.1 |
| 7,702,658 B2 * | 4/2010 | Dunn ..................... | 707/999.201 |
| 7,739,223 B2 * | 6/2010 | Vaschillo et al. | |
| 7,769,770 B2 * | 8/2010 | Denuit et al. ................. | 707/759 |
| 7,779,386 B2 * | 8/2010 | Seitz et al. .................... | 717/108 |
| 7,793,255 B1 * | 9/2010 | Kawaguchi et al. .......... | 717/100 |
| 7,801,856 B2 * | 9/2010 | Warner ............. | G06F 17/30569 707/626 |
| 7,802,180 B2 * | 9/2010 | Warner et al. ................. | 715/234 |
| 7,933,913 B2 * | 4/2011 | Denuit et al. ................. | 707/759 |
| 7,933,935 B2 * | 4/2011 | Idicula et al. ................. | 707/811 |
| 8,065,269 B2 * | 11/2011 | Nica et al. ..................... | 707/625 |
| 8,073,843 B2 * | 12/2011 | Chandrasekar et al. ...... | 707/718 |
| 8,140,558 B2 * | 3/2012 | Kiefer ............... | G06F 17/30917 707/755 |
| 8,150,893 B2 * | 4/2012 | Bohannon et al. ............ | 707/803 |

(Continued)

OTHER PUBLICATIONS

Funderburk, J.E., et al., "XML Programming with SQL/XML and XQuery," 2002, IBM Systems Journal, vol. 41, No. 4, pp. 642-665 (24 total pages).*

Murphy, Brian, "Order-sensitive XML Query Processing Over Relational Sources," Master of Science in Computer Science thesis, Worcester Polytechnic Institute, May 2003, pp. 1-103.*

(Continued)

*Primary Examiner* — Farhan Syed
(74) *Attorney, Agent, or Firm* — Vista IP Law Group, LLP; Peter Mei

(57) ABSTRACT

Disclosed is a method, system, and program product for providing an efficient mechanism to provide updateable relational views over XML. This will allow application developers to write both queries and updates using a relational (SQL) syntax, even though the underlying data is stored as XML. According to some approaches, this is accomplished by implementing a reverse mapping from the data within the views to the node addresses of the corresponding data in the underlying XML document.

37 Claims, 10 Drawing Sheets

(56) References Cited

U.S. PATENT DOCUMENTS

| | | | |
|---|---|---|---|
| 8,161,035 B2* | 4/2012 | Zhang et al. | 707/713 |
| 8,239,373 B2* | 8/2012 | Sthanikam et al. | 707/718 |
| 8,321,478 B2* | 11/2012 | Fong | G06F 17/2264 707/756 |
| 2002/0133484 A1* | 9/2002 | Chau | G06F 17/30917 |
| 2002/0156772 A1* | 10/2002 | Chau | G06F 17/30917 |
| 2003/0014397 A1* | 1/2003 | Chau | G06F 17/30917 |
| 2003/0028545 A1* | 2/2003 | Wang et al. | 707/100 |
| 2003/0105745 A1* | 6/2003 | Davidson et al. | 707/3 |
| 2004/0060006 A1* | 3/2004 | Lindblad et al. | 715/513 |
| 2004/0267760 A1* | 12/2004 | Brundage et al. | 707/100 |
| 2005/0055336 A1* | 3/2005 | Hui et al. | 707/3 |
| 2005/0065949 A1* | 3/2005 | Warner et al. | 707/100 |
| 2005/0091231 A1* | 4/2005 | Pal et al. | 707/100 |
| 2005/0149907 A1* | 7/2005 | Seitz et al. | 717/108 |
| 2005/0165866 A1* | 7/2005 | Bohannon et al. | 707/203 |
| 2005/0289175 A1* | 12/2005 | Krishnaprasad et al. | 707/102 |
| 2006/0015490 A1* | 1/2006 | Denuit et al. | 707/4 |
| 2006/0031204 A1 | 2/2006 | Liu et al. | |
| 2006/0031233 A1* | 2/2006 | Liu et al. | 707/100 |
| 2006/0036644 A1* | 2/2006 | Cheslow | 707/104.1 |
| 2006/0036935 A1* | 2/2006 | Warner et al. | 715/500 |
| 2006/0173861 A1* | 8/2006 | Bohannon et al. | 707/100 |
| 2006/0173865 A1* | 8/2006 | Fong | G06F 17/2264 |
| 2006/0224576 A1* | 10/2006 | Liu | G06F 17/30917 |
| 2007/0136250 A1* | 6/2007 | Lindblad et al. | 707/3 |
| 2007/0226196 A1* | 9/2007 | Adya | G06F 17/30457 |
| 2008/0120321 A1 | 5/2008 | Liu et al. | |
| 2008/0120322 A1 | 5/2008 | Liu et al. | |
| 2008/0243916 A1 | 10/2008 | Liu et al. | |
| 2009/0158251 A1* | 6/2009 | Angrish et al. | 717/115 |
| 2010/0023478 A1* | 1/2010 | Chandrasekar | G06F 17/30935 707/E17.017 |
| 2010/0030726 A1* | 2/2010 | Chandrasekar et al. | 707/2 |
| 2010/0161555 A1* | 6/2010 | Nica et al. | 707/624 |
| 2010/0281018 A1* | 11/2010 | Denuit et al. | 707/718 |
| 2010/0299327 A1* | 11/2010 | Kiefer | G06F 17/30932 707/736 |
| 2011/0302189 A1* | 12/2011 | Liu et al. | 707/769 |
| 2012/0047117 A1* | 2/2012 | Nica | 707/702 |

OTHER PUBLICATIONS

A. Furtado and M. Casanova, "Updating Relational Views," in W. Kim et al., eds., Query Processing in Database Systems, Springer-Verlag Topics in Information Systems, 127-142 (1985).*

Liu, Zhen Hua, Hui J. Chang, and Balasubramanyam Sthanikam. "Efficient support of xquery update facility in xml enabled rdbms." In Data Engineering (ICDE), 2012 IEEE 28th International Conference on, pp. 1394-1404. IEEE, 2012.*

Braganholo, Vanessa P., Susan B. Davidson, and Carlos A. Heuser. "From XML view updates to relational view updates: old solutions to a new problem." In Proceedings of the Thirtieth international conference on Very large data bases—vol. 30, pp. 276-287. VLDB Endowment, 2004.*

Shanmugasundaram, Jayavel, Eugene Shekita, Jerry Kiernan, Rajasekar Krishnamurthy, Efstratios Viglas, Jeffrey Naughton, and Igor Tatarinov. "A general technique for querying XML Documents using a relational database system." ACM SIGMOND Record 30, No. 3 (2001): 20-26.*

Braganholo, Vanessa P., Susan B. Davidson, and Carlos A. Heuser. "On the updatability of XML views over relational databases." In WebDB, pp. 31-36. 2003.*

Jayavel Shanmugasundaram et al., "Querying XML Views of Relational Data", Proceedings of the 27th VLDB Conference, Roma, Italy, 2001, 10 pages.

Vanessa P. Braganholo et al., "From XML View Updates to Relational View Updates: Old Solutions to a New Problem", Proceedings of the 30th VLDB Conference, Toronto, Canada, 2004, 12 pages.

Ling Wang et al., "Updating XQuery Views Published over Relational Data: Round-trip Case Study", Department of Computer Science, Worcester Polytechnic Institute, Worcester, MA, 2003, 15 pages.

Ling Wang et al., "Updating XML Views Published Over Relational Databases: Towards the Existence of a Correct Update Mapping", Preprint submitted to Elsevier Science, May 2, 2005, 41 pages.

Vanessa P. Braganholo et al. "On the updatability of XML Views Over Relational Databases", International Workshop on the Web and Databases (WebDB), Jun. 12-13, 2003, San Diego, CA, 6 pages.

* cited by examiner

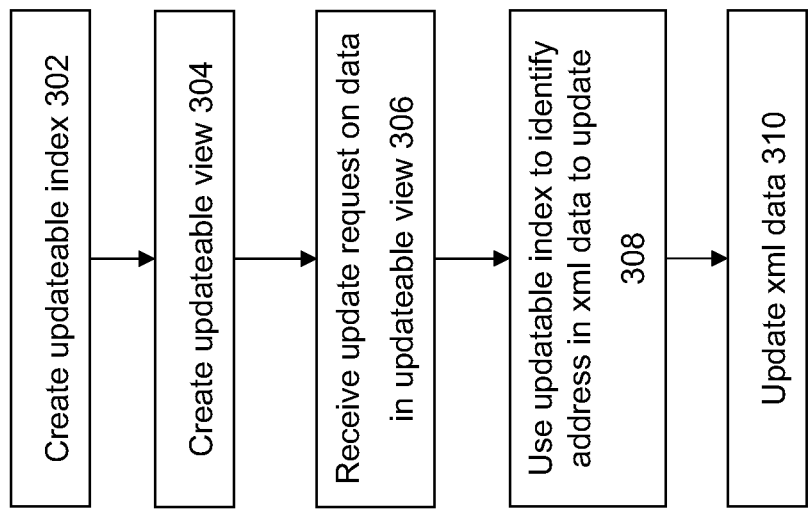

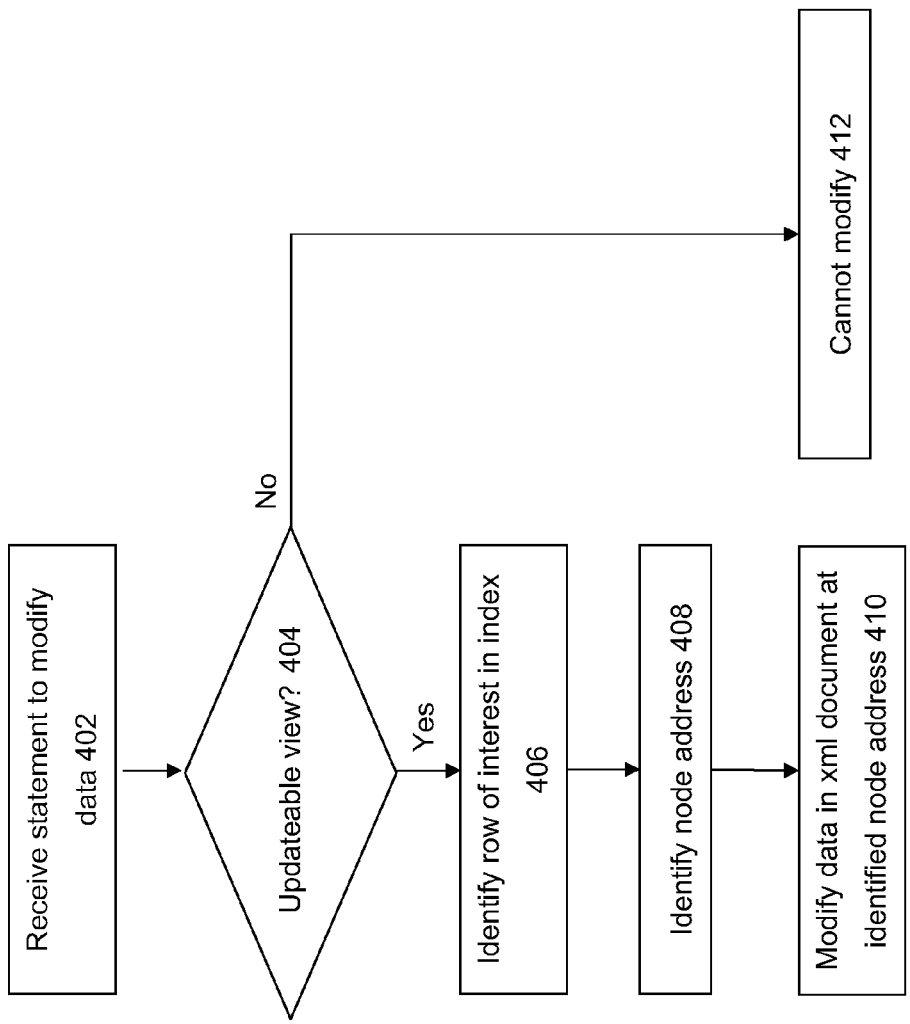

502 {
```
create or replace updateable view foo_detailed_view
    ("GlobalObjectId",
    "StartDate",
    "EndDate",
    "ObjectStartDate",
    "ObjectEndDate",
    "DateInfo",
    "ItemId",
    "ItemExpirationDate") as
```

504 ↗
```
select x."GlobalObjectId",
    x."StartDate",
    x."EndDate",
    x."ObjectStartDate",
    x."ObjectEndDate",
    x."DateInfo",
    y."ItemId",
    y."ItemExpirationDate"
from foo,
xmltable('/RECORD'
```

506 ↗
```
    PASSING foo.object_value
    COLUMNS
    "DvPublicationId" NUMBER  PATH 'DerivedInfo/DvPublicationId',
    "GlobalObjectId" NUMBER  PATH 'ObjectInfo/RecInfo/GlobalObjectId',
    "StartDate" DATE    PATH 'ObjectInfo/StartDate',
    "EndDate" DATE    PATH 'ObjectInfo/EndDate',
    "ObjectStartDate" DATE    PATH 'ObjectInfo/ObjectStartDate',
    "ObjectEndDate" DATE    PATH 'ObjectInfo/ObjectEndDate',
    "DateInfo" DATE    PATH 'ObjectInfo/DateInfo',
    "ObjectDetails" XMLTYPE PATH 'ObjectInfo/ObjectItems'
    ) x,
xmltable('/ObjectItems/ObjectEntry'
    PASSING x."ObjectDetails"
    COLUMNS
        "ItemId" NUMBER PATH 'ObjectItemId',
    "ItemExpirationDate" DATE   PATH 'ObjectItemExpirationDate'
    ) y;
```

Figure 7

```
create index foo_idx on foo p (p.object_value)
indextype is xdb.xmlindex
parameters
         ('updateable xmltable FOO_STRUCT_TAB "/RECORD"
         PASSING p.object_value
         COLUMNS
             DvPublicationId NUMBER PATH
         "DerivedInfo/DvPublicationId"',
             GlobalObjectId NUMBER PATH
         "ObjectInfo/RecInfo/GlobalObjectId",
             StartDate DATE PATH "ObjectInfo/StartDate",
             EndDate DATE PATH "ObjectInfo/EndDate",
             ObjectStartDate DATE PATH "ObjectInfo/ObjectStartDate",
             ObjectEndDate DATE PATH "ObjectInfo/ObjectEndDate",
             DateInfo DATE PATH "ObjectInfo/DateInfo"'
         );
```

```
create or replace updateable view foo_detailed_view
   ("GlobalObjectId",
    "StartDate",
    "EndDate",
    "ObjectStartDate",
    "ObjectEndDate",
    "DateInfo",
    "ItemId",
    "ItemExpirationDate") as
select x."GlobalObjectId",
     x."StartDate",
     x."EndDate",
     x."ObjectStartDate",
     x."ObjectEndDate",
     x."DateInfo",
     y."ItemId",
     y."ItemExpirationDate"
from foo,
xmltable('/RECORD'
      PASSING foo.object_value
      COLUMNS
   "DvPublicationId" NUMBER  PATH 'DerivedInfo/DvPublicationId',
    "GlobalObjectId" NUMBER  PATH 'ObjectInfo/RecInfo/GlobalObjectId',
       "StartDate" DATE    PATH 'ObjectInfo/StartDate',
       "EndDate" DATE    PATH 'ObjectInfo/EndDate',
    "ObjectStartDate" DATE    PATH 'ObjectInfo/ObjectStartDate',
    "ObjectEndDate" DATE    PATH 'ObjectInfo/ObjectEndDate',
      "DateInfo" DATE    PATH 'ObjectInfo/DateInfo',
    "ObjectDetails" XMLTYPE PATH 'ObjectInfo/ObjectItems'
     ) x,
xmltable('/ObjectItems/ObjectEntry'
      PASSING x."ObjectDetails"
      COLUMNS
         "ItemId" NUMBER PATH 'ObjectItemId',
    "ItemExpirationDate" DATE   PATH 'ObjectItemExpirationDate'
      ) y;
```

902 → "ObjectDetails" XMLTYPE PATH 'ObjectInfo/ObjectItems'

904 → PASSING x."ObjectDetails"

METHOD AND SYSTEM FOR IMPLEMENTING EFFICIENT UPDATABLE RELATIONAL VIEWS OVER XML DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Relational database management systems (RDBMSs) store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries. A user retrieves information from and makes updates to a database by interacting with a database application. The user's actions are converted into a query by the database application. The database application submits the query to a database server. The database server responds to the query by accessing the tables specified in the query to determine which information stored in the tables satisfies the query. The information that satisfies the query is retrieved by the database server and transmitted to the database application. Alternatively, a user may request information directly from the database server by constructing and submitting a query directly to the database server using a command line or graphical interface. Queries submitted to the database server must conform to the syntactical rules of a database query language. One popular database query language, known as the Structured Query Language (SQL), provides users a variety of ways to specify information to be retrieved from relational tables.

The Extensible Markup Language (XML) provides a convenient way to express information in a hierarchically structured format. An XML document is a document that conforms to the XML standard. An XML document is typically composed of a set of nodes arranged in a hierarchy. Each node of a XML document may be composed of a set of one or more tags, and each node may have a set of associated attributes. A node may also be associated with a portion of the text of the XML document.

For a variety of reasons, it is often advantageous to store XML-formatted information/documents within a relational database table. A relational table column can be configured to store XML-formatted information in a "native" format, such that the structure of the XML information is preserved, e.g., using an XMLType(document) type, or an XMLType(content) type. Only XMLType(document) type instances can be stored in an XMLType(document) type column, and only XMLType(content) type instances can be stored in an XMLType(content) type column.

Once a set of XML documents are stored within a database, it would be advantageous to use an XML query language to retrieve, from the database, those XML documents that match a set of search criteria. An XML query language is a language that allows an operation, such as a search, to be performed on one or more XML documents, to be expressed. Illustrative examples of an XML query language are XPath and XQuery.

When a SQL query is executed, the results are returned as a row set, which is a set of rows. In contrast, when an XQuery query is executed, the results are returned as an instance of XMLType(sequence) type. In XQuery terminology, the result of an XQuery is an instance of XQuery data model.

The problem with this approach is that developers need to know the semantics of XML, XPath, or XQuery to use these approaches to query the XML data. This is typically much less convenient than an approach that allows developers to use ordinary SQL.

To address this problem, the SQL/XML standard has been developed which enables XML to be queried from within SQL. One of the constructs supported by this standard is the XMLTABLE( ) construct. The XMLTABLE( ) construct is a table function that projects a relational view of data residing in XML documents. Certain applications can be written entirely as SQL queries against these XMLTABLE( ) based relational views. Such an approach hides the application developers from knowing anything about XML, XPath, or XQuery. Once the relational views have been defined, it is simple to write SQL queries on these views.

Conventionally, these views are read-only views and therefore cannot be used to perform modifications or updates to the underlying data. One reason for this is because SQL/XML standard does not define a mechanism to update these views. Therefore, if the application desires to update certain fields within the XML, then it has to do a full document replacement or perform node level updates using XQuery Update or vendor-proprietary update operators.

SUMMARY

Some embodiments of the present invention are directed to an efficient mechanism to provide updateable relational views over XML. This will allow application developers to write both queries and updates using a relational (SQL) syntax, even though the underlying data is stored as XML. According to some embodiments, this is accomplished by implementing a reverse mapping from the data within the views to the node addresses of the corresponding data in the underlying XML document.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 3 shows a flowchart of an approach for implementing updateable relational views according to an embodiment of the invention.

FIG. 4 shows a flowchart of an approach for implementing updates according to an embodiment of the invention.

FIG. 5 shows an example view definition according to an embodiment of the invention.

FIG. 7 illustrates an example index definition according to an embodiment of the invention.

FIG. 9 shows an example view definition with chaining according to an embodiment of the invention.

DETAILED DESCRIPTION

Some embodiments of the present invention are directed to an efficient mechanism to provide updateable relational views over XML. This will allow application developers to write both queries and updates using a relational (SQL) syntax, even though the underlying data is stored as XML. According to some embodiments, this is accomplished by implementing a reverse mapping from the data within the views to the node addresses of the corresponding data in the underlying XML document.

Figure 1:
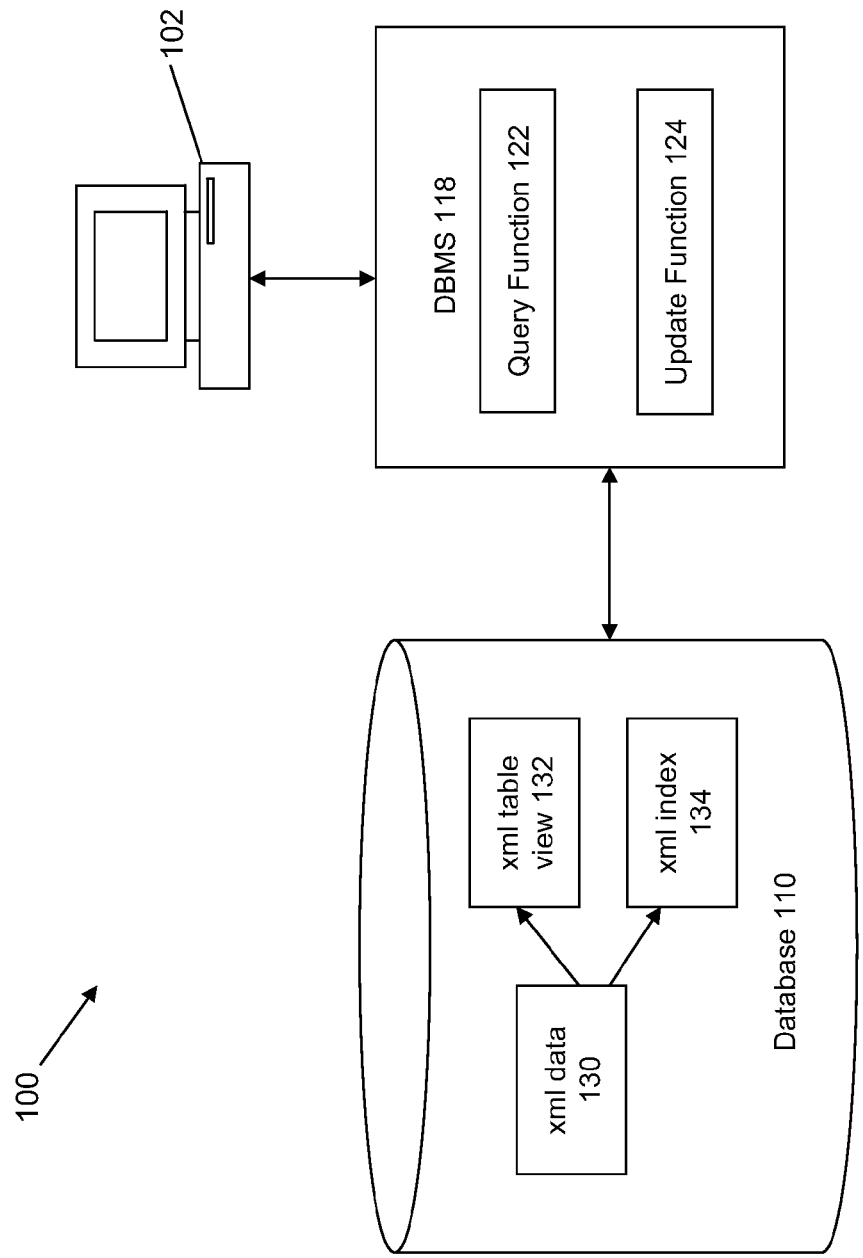
FIG. 1 illustrates an example system according to an embodiment of the invention.

FIG. 1 shows an architecture of a system 100 for providing updateable relational views over XML data according to some embodiments of the invention. System 100 may include one or more users at one or more user stations 102 that operate the system 100 to use DBMS 118 to access a database 110. The users at user station 102 correspond to any individual, organization, or other entity that uses system 100 for utilizing DBMS 118. User station 102 comprises any type of computing station that may be used to operate or interface with DBMS 118. Examples of such user stations 102 include for example, workstations, personal computers, or remote computing terminals. User station 102 comprises a display device, such as a display monitor, for displaying electronic design layouts and processing results to users at the user station 102. User station 102 also comprises one or more input devices for the user to provide operational control over the activities of system 100, such as a mouse or keyboard to manipulate a pointing object in a graphical user interface.

The DBMS 118 may be associated with databases 110 that stores data on one or more computer readable mediums or storage devices. The computer readable storage devices comprise any combination of hardware and software that allows for ready access to the data within database 110. For example, the computer readable storage device could be implemented as computer memory or disk drives operatively managed by an operating system.

The system 100 includes XML data 130 that are stored within the database 110. An updatable relational view 132 is supported over the XML data 130. According to some embodiments, the updateable relational view 132 over the XML data 130 is generated using the SQL/XML construct XMLTABLE( ) to project out the updateable relational view 132.

A mechanism exists in system 100 to provide a reverse mapping from the rows in updateable relational view 132 to the underlying data in the XML data 130. According to some embodiments, this mechanism is implemented as an XML index 134 in the database 110, which corresponds to the XML data 130. The XML index 134 can be implemented as an xmltable-based index that is configured to store node references in each storage table of the index. The node references in the xml index 134 allows for a reverse look-up to specific node addresses within the xml data 130 corresponding to data/rows within the updateable relational view 132.

In operation, the DBMS 118 supports both query functions 122 and update functions 124 over the updateable view 132.

The query function 122 allows for SQL queries to be made against updateable relational view 132.

The update function 124 allows updates to be made against the updateable relational view 132, such that the intended updates can be performed against the underlying XML data 130. This is accomplished by allowing the update function 124 to access the node address information from the XML index 134. The node address information essentially provides a reverse look-up to specific locations within the XML data 130 corresponding to the row data being updated. In this manner, the update function 124 can therefore know exactly where within the XML data 130 to make the necessary changes. As used herein, the term "update" refers to any supportable changes or modifications to the XML data 130, and is therefore not limited only to the "update" statement within SQL. For example, the "delete" operation is also expressly within the scope of the invention as an "update" that can be applied to the updateable relational view 132.

Figure 2:
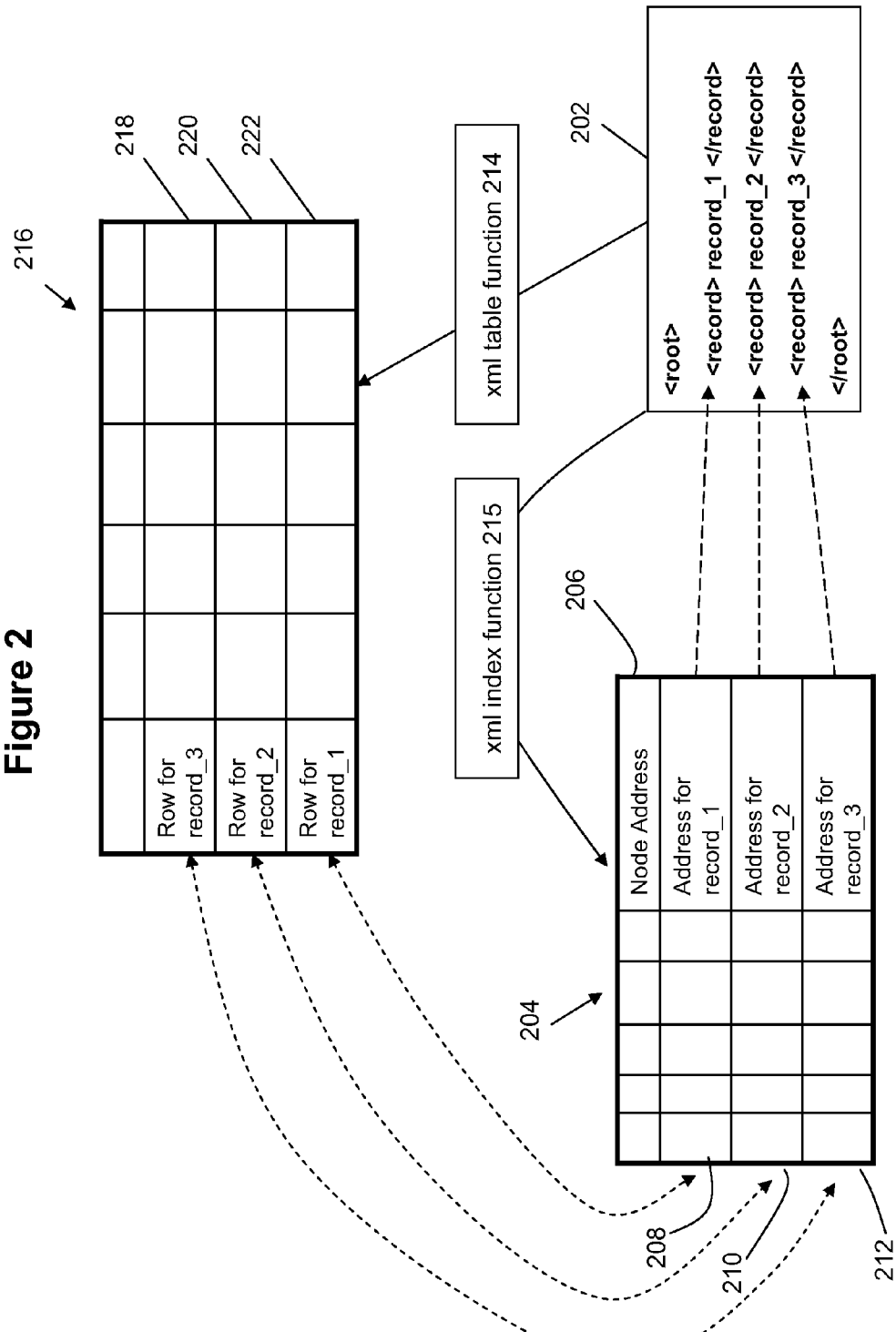
FIG. 2 illustrates the relationship between XML data, an updateable relational view, and an index table according to an embodiment of the invention.

FIG. 2 provides an illustration of the example database structures that can be used to provide updateable relational views of XML data. XML data 202 comprises a set of data that can be abstracted to create a relational view. In the example of FIG. 2, each record node corresponds to a subtree of values that can be used to construct a separate row within the updateable view 216. As illustrated in this figure, there are three record nodes corresponding to record_1, record_2, and record_3.

The XMLTABLE( ) function 214 can be used to create rows 218, 220, and 222 in updateable relational view 216 from record nodes record_3, record_2, and record_1, respectively. For example, this can be accomplished by taking a row expression (e.g., an XPath or XQuery expression), and using that row expression to identify the nodes in XML data 202 that are of interest, and which are then used to populate the rows of updateable relational view 216. The XMLTABLE( ) construct also uses column expression to identify the specific elements of the node subtree in XML data 202 that will map to the columns of the updateable view 216. More details regarding an example approach to create XML tables are described in U.S. Publication No. 20060031204, which is hereby incorporated by reference in its entirety.

The XML index construction function 215 can be used to create an index table 204. The rows in the index table 204 corresponds to the nodes in XML data 202 that are associated with a row in the updateable relational view 216. Each row in index table 204 includes a node address column 206 that includes the node address for the node associated with its respective row in the updateable relational view 216. More details regarding a general approach to create XML index tables are described in U.S. Publication No. 20080243916, 20080120321, and/or 20080120322, which are hereby incorporated by reference in their entirety.

In this current example, row 208 in index table 204 corresponds to row 218 in the updateable relational view 216, which includes the values for the record_1 node in XML data 202. Therefore, the value in the node address column for row 208 includes the node address for node record_1 in the XML data 202. Similarly, row 210 in index table 204 corresponds to row 220 in the updateable relational view 216, which includes the values for the record_2 node in XML data 202. Therefore, the value in the node address column for row 210 includes the node address for node record_2 in the XML data 202. Row 212 in index table 204 corresponds to row 222 in the updateable relational view 216, which includes the values for the record_3 node in XML data 202. Therefore, the value in the node address column for row 212 includes the node address for node record_3 in the XML data 202.

Assume that instructions are given at some point to perform an update operation on the updateable relational view 216. When this occurs, the DBMS will check the index table 204 to identify the row(s) of the index table 204 that corresponds to the row(s) of the updateable relational view 216 that are being changed. From these row(s) in the index table 204 that have been identified, the node addresses for the nodes in the XML data 202 that need to be updated can then be identified. The DBMS will then use these node addresses to modify the appropriate sets of data in the XML data 202.

FIG. 3 shows a flowchart of an approach for implementing updateable relational views according to some embodiments of the invention. At 302, an updateable index is created for the data of interest which includes a node address column. According to the present embodiment, an updateable relational view can only exist if there is a corresponding set of data that includes a way to provide a reverse look-up into the XML data (e.g. the index table with the node address column). In some embodiments, an index definition is used to create the index table, there the index definition corresponds to the XML table definition that is used to create the updateable relation view.

At 304, the updateable relation view is created. A view definition is used to create the updateable relational view, where the view expression includes a row expression (e.g., an XPath or XQuery expression) that identifies the nodes in XML data that are used to populate the rows of the updateable relational view. The view definition also includes a column expression to identify the elements of the node in the XML data that correspond to the columns of the updateable relational view.

Once the updateable relational view and index tables have been created, the DBMS is ready to perform user processing to either query the updateable relational view, or to make an update to the data within the updateable relational view. Therefore, at 306, a request will later be received to perform an update operation on the updateable relational view. As previously indicated, the update operation can be any supportable operation to modify the data within the updateable relational view. Examples of such operations include the "update" and "delete" statements in SQL.

At 308, the index table is used to identify the node address in the XML data for the data that is being modified by the update operation. This is performed by using the SQL statement to filter for the correct rows of interest in the index table. The node address columns for the identified rows in the index table are then used to identify the node addresses for the nodes of interest in the XML data. At 310, the DBMS will then use the node addresses to perform the update operations within the XML data.

FIG. 4 shows a more detailed flowchart of an approach for performing an update operation on data in a relational view. At 402, an instruction is received at the DBMS to perform the update operation. The instruction can be in the form of a SQL statement. At 404, a determination is made whether the update instruction pertains to an updateable relational view, i.e., a view that has been configured to include related metadata to allow a reverse look-up into the underlying XML data. For example, a check is made whether the view has been defined as an "updateable" view and/or whether there is a corresponding structure (e.g., an index table) that includes node addresses for the rows of the updateable view. If not, then the update process terminates at 412.

If the view is an updateable view, then the process proceeds to 406 to identify the rows of interest within the index table for the rows being modified. According to some embodiments, the predicate within the update SQL statement is used to filter for the appropriate rows within the index.

From those identified rows, the nodes addresses of interest are then identified at 408. This action is accomplished by reading the nodes addresses from the node address column of the index table for the rows of interest. At 410, the DBMS can then go to the identified node addresses within the XML data to perform the requested update operations.

An illustrative example of an embodiment of the invention will now be described. FIG. 5 shows an example of a view definition statement that can be used to create an updateable view named "foo_detailed_view". The definition of this example view in FIG. 5 makes use of the XMLTABLE( ) construct 506 to project out scalar values from within XML documents. The XMLTABLE( ) construct 506 takes a row pattern and one or more column patterns. Each row pattern is an XQuery or XPath expression.

The "select" statement 504 is used to project out the one or more columns from the underlying row source (i.e., from the XML document "foo"). The top portion 502 is used to identify which of the projected columns are to be included into the updateable view.

In this example, the row pattern is /RECORD. For each XML node matching the row pattern, the XMLTABLE( ) construct projects out certain scalar values. The values to project and their projected types are specified using column patterns and column types. Each column pattern can be arbitrary XQuery or XPath.

For example, in this view definition, DerivedInfo/DvPublicationId is a column pattern and the value of the node matching that column pattern (evaluated with the node matching the row pattern as the context node) is projected out as a NUMBER column. This NUMBER column is named "DvPublicationId" in the above view definition.

ObjectInfo/recInfo/GlobalObjectId is another column pattern and the value of the node matching that column pattern (evaluated with the node matching the row pattern as the context node) is projected out as a NUMBER column. This NUMBER column is named "GlobalObjectId" in this view definition. In a similar way, DATE columns are projected out for the columns patterns for "Startdate", "EndDate", "ObjectStartDate", "ObjectEndDate", "DateInfo", and "OBjectDetails".

Normally, a view based on XMLTABLE( ) is read-only. However, an example implementation can add a keyword 508 (such as "updateable") to the view definition to indicate that this view can be used in an update statement. Note the keyword 508 ("updateable") is included in the view definitions shown in FIG. 5.

Figure 6:
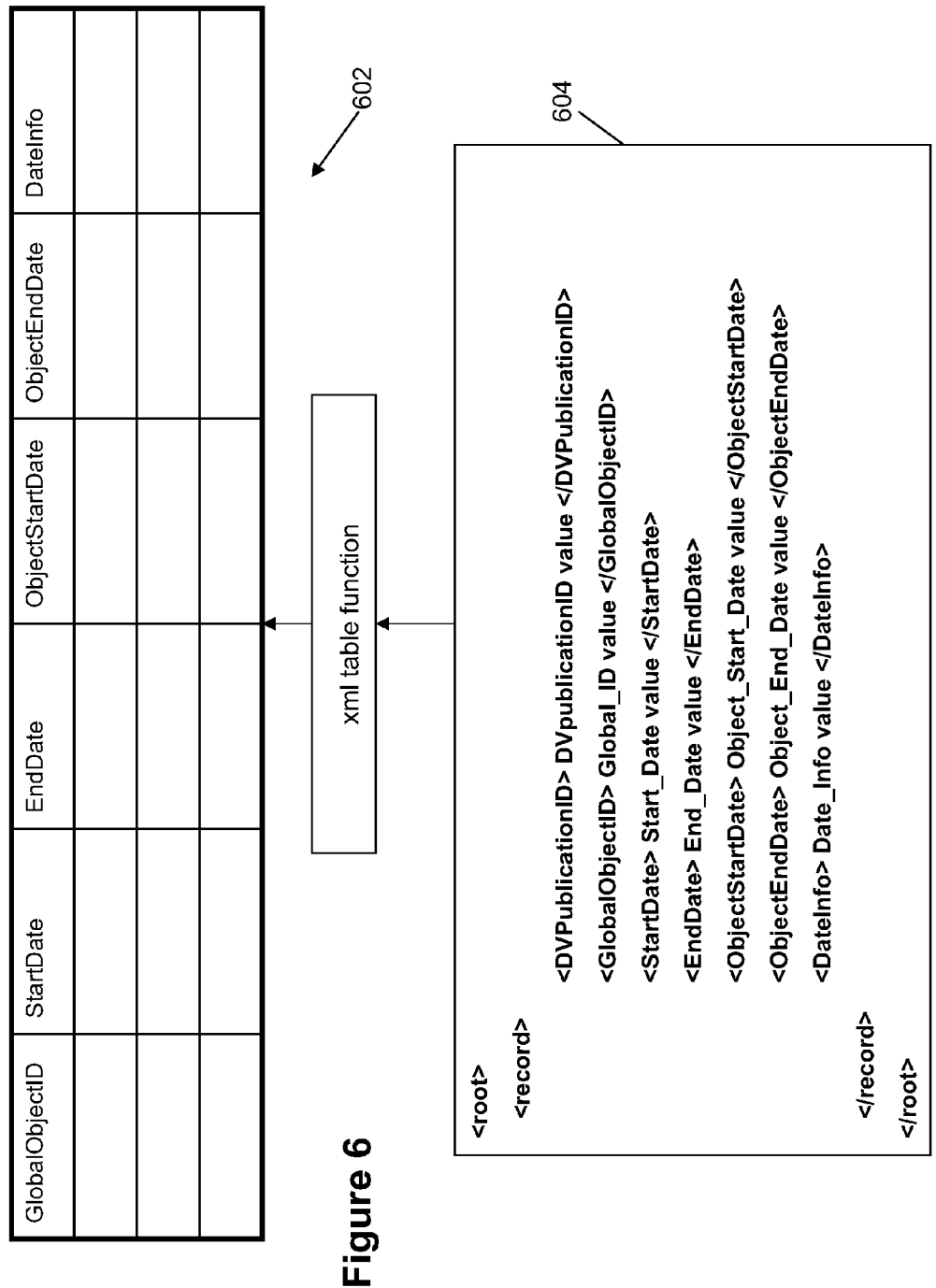
FIG. 6 illustrates an updateable relational view according to an embodiment of the invention.

FIG. 6 illustrates how this view definition of FIG. 5 can be used to generate an updateable view 602 from the underlying XML data 604. Here, the "record" node comprises a subtree of elements that have been used to project a set of columns. Portion 502 of the view expression in FIG. 5 identifies a set of the projected columns to be included into the updateable view 602. In particular, the top portion 502 of FIG. 5 identifies "GlobalObjectId", "Startdate", "EndDate", "ObjectStartDate", "ObjectEndDate", and "DateInfo" as the columns for the updateable view. These columns are therefore created and shown in updateable view 602 of FIG. 6.

When an updateable XMLTABLE( ) based view is defined, a check is made whether there is an xmltable-based index that semantically matches the definition of the view. An xmltable-based index is built on the notion of the XMLTABLE( ) construct. It materializes the scalar values that are projected by an XMLTABLE( ) expression as columns of a relational table. Each such relational table is called a storage table, and all storage tables are hidden under the index.

FIG. 7 shows the definition 702 of an example xmltable-based index that corresponds to the view definition of FIG. 5. Note that this index definition 702 has a correspondence with the view foo_detailed_view defined earlier, e.g., with regards to the column definitions section 706. The index has one storage table, named FOO_STRUCT_TAB, and the content of this table has the materialization of scalar values projected by an XMLTABLE( ) expression. This XMLTABLE( ) expression forms the basis of the index definition, as illustrated above.

As is the case with an updateable view, the implementation of the updateable index can include a keyword 704 (such as "updateable") to the index definition to indicate that this index can be used in association with an updateable view. Note the keyword 704 ("updateable") is included in the index definition shown in FIG. 7.

During the creation of an updateable view, a check is made whether an xmltable-based index whose definition matches the definition of the view exists. A check is also made to see if the index is marked as updateable. An "updateable" index stores a hidden column for node addresses in each of its internal storage tables. Such an "updateable" xmltable-based index can be created, for example, by specifying the keyword "updateable" in the parameters clause of the index.

Figure 8:
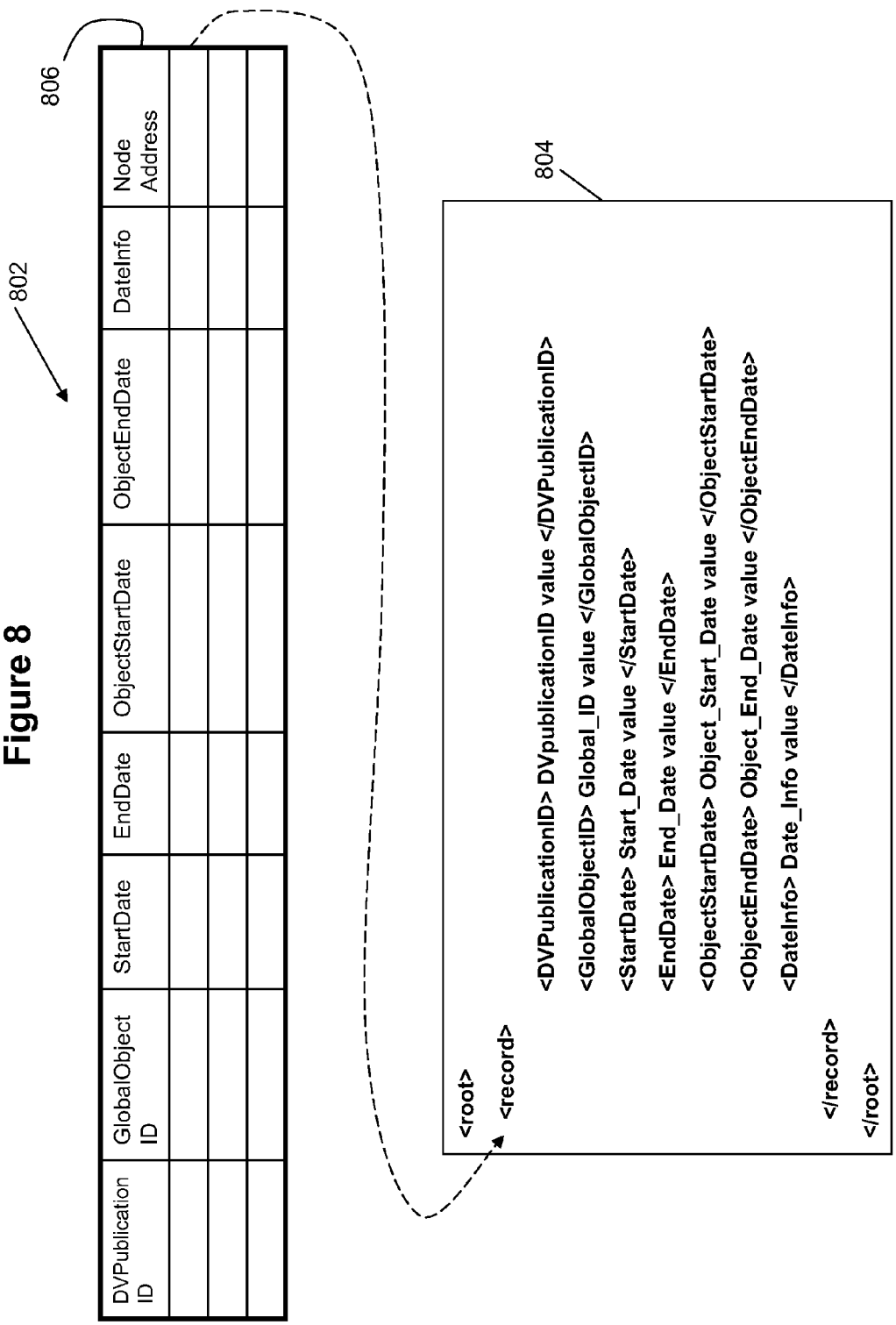
FIG. 8 illustrates an example index table according to an embodiment of the invention.

FIG. 8 illustrates how the index definition 702 of FIG. 7 can be used to generate an index table 802 from the underlying XML data 804. The index table 802 includes columns that correspond to the columns identified in the XMLTABLE( ) construct that was used to construct view 602 from the view definition of FIG. 5. In particular, the index table 802 includes "DVPublicationID", "GlobalObjectId", "Startdate", "End-Date", "ObjectStartDate", "ObjectEndDate", and "DateInfo" as columns in the index table 802.

In addition, the index 802 also includes an additional column 806 to store node addresses for the data within XML data 804 that correspond to the rows of the updateable view. The node address values in this column 806 can be used to perform the reverse look-up into the underlying XML data 804.

While the approach of FIG. 8 shows the node address pointing to nodes at the level of the "record" node and not to its specific subtree elements, it is noted that alternative embodiments can be implemented which provides finer levels of granularity for the reverse lookups. In this alternative approach, the index table can be used to track the addresses for the subtree elements, such as the addresses for the "DVPublicationID", "GlobalObjectId", "Startdate", "End-Date", "ObjectStartDate", "ObjectEndDate", and "DateInfo" nodes in the XML data 804. This approach would be considerably more expensive to create and maintain, but would result in faster processing of update operations.

When a row in the updateable view is updated, a lookup is performed in the hidden column in the corresponding "updateable" index to retrieve the node address of the node in the XML document that needs to be updated. The node address and the column expressions in the view definition are used to update the base XML data.

To illustrate how an update operation is implemented, consider the following update statement:

```
update foo_detailed_view
set "StartDate" = '20021028'
where "GlobalObjectId"=5000;
```

The intent of this update statement is to set the value in the "StartDate" column for each row in the view "foo_struct_view" where the value in the "GlobalObjectId" value is "5000".

For each row in the view that matches the "where" clause condition, the "updateable" xmltable-based index is used to retrieve the node addresses of nodes to be updated. Logically, this is equivalent to a select statement on FOO_STRUCT_TAB. select node_address_column from FOO_STRUCT_TAB where "GlobalObjectId"=5000.

Each retrieved node address is then used to locate nodes to be updated in the base XML. The column pattern of the view column being updated ("StartDate" in the above update statement) is used to identify the specific sub-node in the XML whose value is to be updated. The node address retrieved using the xmltable-based index is the context node for evaluating the column pattern.

The present invention can also be applied to create updateable views for chained XMLTABLE( ) constructs. In such a case, a column projected as XMLTYPE by the first XMLTABLE( ) becomes the context for evaluating the row pattern in the second (i.e., chained) XMLTABLE( ). Typically, chaining is used when the XML has collections, such that there are many nodes (within the same XML document) that match the same XPath or XQuery. In such a case, the row pattern in the chained XMLTABLE( ) identifies all nodes that are part of the collection.

FIG. 9 shows an example of a chained XMLTABLE( ) construct, where portion 902 identifies an object "ObjectDetails" of type "XMLTYPE" that is used for the chaining. This is not a scalar value, but is instead a subtree that is projected as this special type. Portion 904 further projects "ObjectDetails" for the chaining. The chained XMLTABLE( ) aliased to "y" in this definition operates on an xml node returned by column "ObjectDetails" of the first XMLTABLE( ) construct. There are many nodes matching the XPath/RECORD/ObjectInfo/ObjectItems/ObjectEntry, and each node matching this XPath is identified by the row pattern in the XMLTABLE( ) aliased to "y".

When there is chaining, the "node address" column would be added to all of the corresponding index tables for the chained XMLTABLE views. Therefore, in this example of FIG. 9, there would be two index tables that include the node address column.

An update operation can also be performed on a view that has chained XMLTABLE( ). The following is an example of an update operation that is applied to a chained view:

```
update foo_detailed_view
set "ItemExpirationDate"='070909'
where "ItemId"=5001;
```

In this situation, the "node address" column for all of the multiple index tables would be accessed to perform the lookup into the XML data to perform the update operation.

As noted above, an updateable view can also be used in a delete statement, e.g., as follows:

```
delete foo_detailed_view
where "GlobalObjectId"=5001;
```

The WHERE clause predicate is used to identify all node addresses that need to be deleted, and these node addresses are used to delete XML nodes corresponding to them.

In some embodiments, a view based on XMLTABLE( ) can be implemented as an updateable view even if the row pattern and column pattern in each XMLTABLE( ) expression results in computation of transient XML values. Transient XML values will normally need special handling since they do not have corresponding persistent node addresses. For example, consider if the data type of an underlying XML data object is a "string" type, but the data type of the column in the view that is constructed for this object is a "number" type. A conversion process/function may exist to convert the object from the "string" type to the "number" type, causing a transient XML value to be created.

To address this situation, the update process may be implemented to associate the column values to a callback or a reverse-conversion function. For the current example, the reverse-conversion function may be used to convert the updated column value in the view from the "number" type to a "string" type prior to updating the underlying XML data. Otherwise, it is possible that the transient XML value will cause difficulties in creating an updateable xmltable-based indexes based on the XMLTABLE( ) definitions.

Therefore, what has been described is an approach for implementing updateable view over XML data. The current approach is particularly advantageous since it allows update operations to be performed using ordinary SQL statements.

System Architecture Overview

Figure 10:
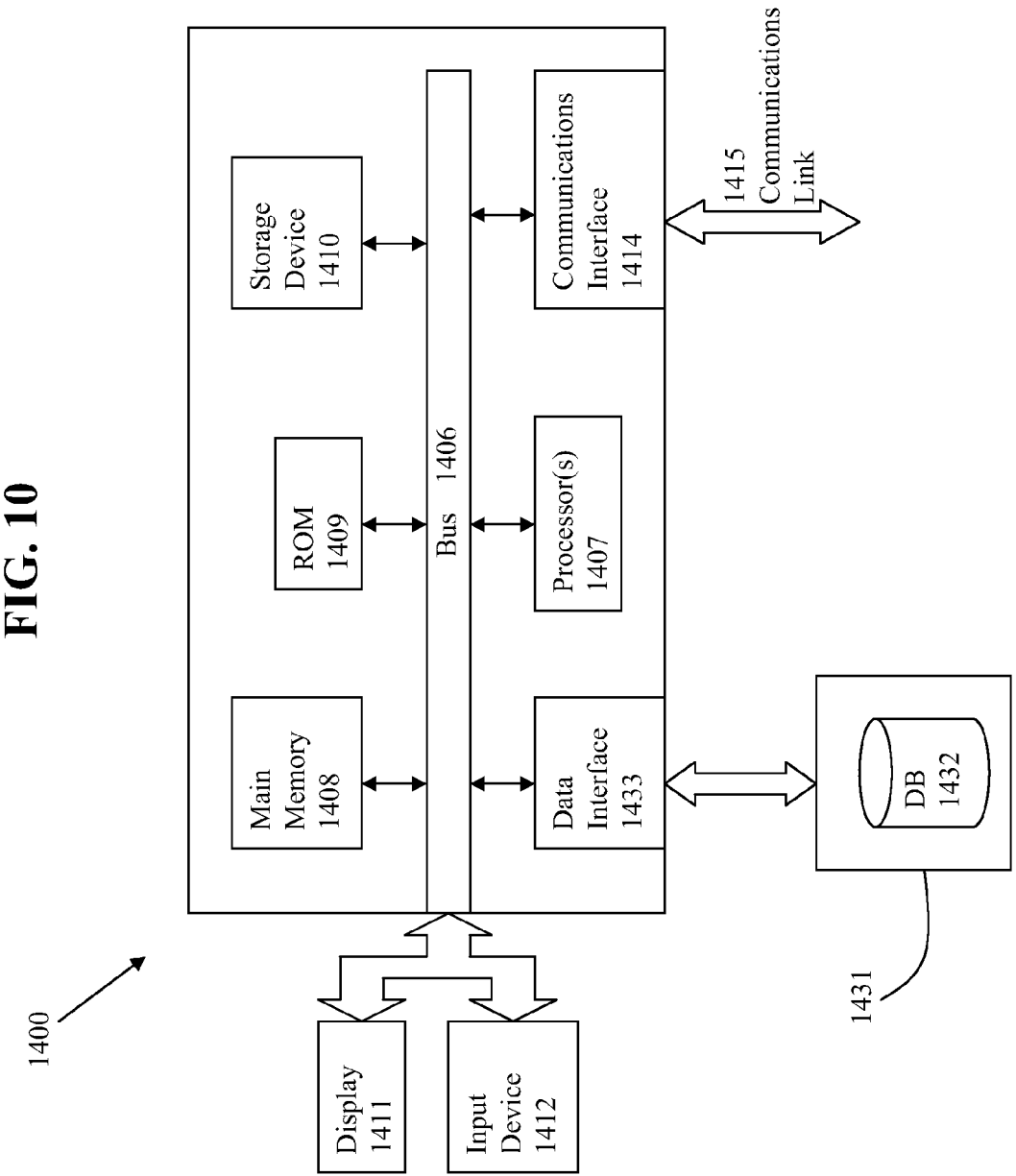
FIG. 10 depicts a computerized system on which a method for re-using digital assertions in a mixed signal context can be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433, data repository 1431, database 1432, and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing an updateable relational view over XML, data, comprising:
generating the updateable relational view to respond to both SQL query operations and SQL update operations, the updateable relational view comprising one or more rows and one or more columns, wherein data within the one or more rows and the one or more columns are populated from underlying XML data that is not stored in a relational format;
using a processor to generate an index table for mapping node addresses within the underlying XML data to the updateable relational view, an entry in the index table relates a node in the underlying XML data to an item of the data in the updateable relational view, wherein the entry in the index table comprises a column that includes a node address for the node in the underlying XML data;
receiving a SQL update operation, wherein the SQL update operation includes an update is directed to the updateable relational view and not to the underlying XML data;
identifying the item of the data for updating in the updateable relational view to implement the SQL update operation, the item of the data corresponding to the node in the underlying XML data;
using the index table to identify the node address of the node in the underlying XML data; and
updating the node at the node address within the underlying XML data to implement the update made to the updateable relational view by the SQL update operation.

2. The method of claim 1 in which the SQL update operation comprises a SQL statement.

3. The method of claim 1 in which the index table is created using an index definition, wherein the index definition corresponds to an XML table definition used to create the updateable relation view.

4. The method of claim 1 in which a row expression expressed with either XPath or XQuery is used to construct the index table.

5. The method of claim 1 in which a predicate within the SQL update operation is used to filter the node addresses to perform the update operation.

6. The method of claim 1 in which the SQL update operation corresponds to an update statement or a delete statement for the updateable relational view.

7. The method of claim 1 in which the updateable relational view comprises an XMLTABLE( ) construct.

8. The method of claim 1 in which a node address points to a subtree of elements in the XML data.

9. The method of claim 1 in which a callback or reverse conversion function is used to perform an update operation that corresponds to transient XML values.

10. A computer program product embodied on a non-transitory computer usable medium, the non-transitory computer readable medium having stored thereon a sequence of instructions which, when executed by a processor causes the processor to execute a method for implementing an updateable relational view over XML data, the method comprising:
   generating the updateable relational view to respond to both SQL query operations and SQL update operations, the updateable relational view comprising one or more rows and one or more columns, wherein data within the one or more rows and the one or more columns are populated from underlying XML data that is not stored in a relational format;
   using a processor to generate an index table for mapping node addresses within the underlying XML data to the updateable relational view, wherein an entry in the index table relates a node in the underlying XML data to an item of the data in the updateable relational view, wherein the entry in the index table comprises a column that includes a node address for the node in the underlying XML data;
   receiving a SQL update operation, wherein the SQL update operation includes an update is directed to the updateable relational view and not to the underlying XML data;
   identifying the item of the data for updating in the updatable relational view to implement the SQL update operation, the item of the data corresponding to the node in the underlying XML data;
   using the index table to identify the node address of the node in the underlying XML data; and
   updating the node at the node address within the underlying XML data to implement the update made to the updateable relational view by the SQL update operation.

11. The computer program product of claim 10 in which the SQL update operation comprises a SQL statement.

12. The computer program product of claim 10 in which the index table is created using an index definition, wherein the index definition corresponds to an XML table definition used to create the updateable relation view.

13. The computer program product of claim 10 in which a row expression expressed with either XPath or XQuery is used to construct the index table.

14. The computer program product of claim 10 in which a predicate within the SQL update operation is used to filter the node addresses to perform the update operation.

15. The computer program product of claim 10 in which the SQL update operation corresponds to an update statement or a delete statement for the updateable relational view.

16. The computer program product of claim 10 in which the updateable relational view comprises an XMLTABLE( ) construct.

17. The computer program product of claim 10 in which a node address points to a subtree of elements in the XML data.

18. The computer program product of claim 10 in which a callback or reverse conversion function is used to perform an update operation that corresponds to transient XML values.

19. A computer-based system for implementing an updateable relational view over XML data, comprising:
   a computer processor to execute a set of program code instructions;
   a memory to hold the program code instructions, in which the program code instructions comprises program code to:
   generate the updateable relational view to respond to both SQL query operations and SQL update operations, the updateable relational view comprising one or more rows and one or more columns, wherein data within the one or more rows and the one or more columns are populated from underlying XML data that is not stored in a relational format;
   use the processor to generate an index table for mapping node addresses within the underlying XML data to the updateable relational view, an entry in the index table relates a node in the underlying XML data to an item of the data in the updateable relational view, wherein the entry in the index table comprises a column that includes a node address for the node in the underlying XML data;
   receive a SQL update operation, wherein the SQL update operation includes an update is directed to the updateable relational view and not to the underlying XML data;
   identify the item of the data for updating in the updatable relational view to implement the SQL update operation, the item of the data corresponding to the node in the underlying XML, data;
   use the index table to identify the node address of the node in the underlying XML data; and
   update the node at the node address within the underlying XML data to implement the update made to the updateable relational view by the SQL update operation.

20. The system of claim 19 in which the SQL update operation comprises a SQL statement.

21. The system of claim 19 in which the index table is created using an index definition, wherein the index definition corresponds to an XML table definition used to create the updateable relation view.

22. The system of claim 19 in which a row expression expressed with either XPath or XQuery is used to construct the index table.

23. The system of claim 19 in which a predicate within the SQL update operation is used to filter the node addresses to perform the update operation.

24. The system of claim 19 in which the SQL update operation corresponds to an update statement or a delete statement for the updateable relational view.

25. The system of claim 19 in which the updateable relational view comprises an XMLTABLE( ) construct.

26. The system of claim 19 in which a node address points to a subtree of elements in the XML data.

27. The system of claim 19 in which a callback or reverse conversion function is used to perform an update operation that corresponds to transient XML values.

28. A computer implemented method for updating data within an updateable relational view that is constructed over XML data, comprising:
   identifying the updateable relational view to respond to a SQL update operation, the updateable relational view comprising one or more rows and one or more columns, wherein data within the one or more rows and the one or more columns are populated from underlying XML data that is not stored in a relational format;
   receiving an instruction to perform the SQL update operation, wherein the SQL update operation includes an update directed to the updateable relational view rather than to the underlying XML data;

identifying an item of the data for updating in the updatable relational view to implement the SQL update operation, the item of the data corresponding to a node in the underlying XML data;

using a processor to perform the SQL update operation on the item of the data in the updatable relational view; and using a processor to update the node in the underlying XML data to implement the update made to the updateable relational view by the SQL update operation, wherein a reverse lookup is performed on an index table to identify a node address of the node in the underlying XML data corresponding to the item of the data in the updateable relational view, wherein an entry in the index table comprises a column that includes the node address for the node in the underlying XML data.

29. The method of claim 28 in which the SQL update operation comprises a SQL statement.

30. The method of claim 28 in which the index table is created using an index definition, wherein the index definition corresponds to an XML table definition used to create the updateable relation view.

31. The method of claim 28 in which a predicate within the SQL update operation is used to filter the node addresses to perform the update operation.

32. The method of claim 28 in which the update operation corresponds to an update statement or a delete statement for the updateable relational view.

33. The method of claim 28 in which the updateable relational view comprises an XMLTABLE( ) construct.

34. The method of claim 28 in which a node address points to a subtree of elements in the XML data.

35. The method of claim 28 in which a callback or reverse conversion function is used to perform an update operation that corresponds to transient XML values.

36. A computer-based system for updating data within an updateable relational view that is constructed over XML data, comprising:

a computer processor to execute a set of program code instructions;

a memory to hold the program code instructions, in which the program code instructions comprises program code to:

identify the updateable relational view to respond to a SQL update operation, the updateable relational view comprising one or more rows and one or more columns, wherein data within the one or more rows and the one or more columns are populated from underlying XML data that is not stored in a relational format;

receive an instruction to perform the SQL update operation, wherein the SQL update operation includes an update directed to the updateable relational view rather than to the underlying XML data;

identify an item of the data for updating in the updatable relational view to implement the SQL update operation, the item of the data corresponding to a node in the underlying XML data;

use the processor to perform the SQL update operation on the item of the data in the updatable relational view; and use the processor to update the node in the underlying XML data to implement the update made to the updateable relational view by the SQL update operation, wherein a reverse lookup is performed on an index table to identify a node address of the node in the underlying XML data corresponding to the item of the data in the updateable relational view, wherein an entry in the index table comprises a column that includes the node address for the node in the underlying XML.

37. A computer program product embodied on a non-transitory computer usable medium, the non-transitory computer readable medium having stored thereon a sequence of instructions which, when executed by a processor causes the processor to execute a method for updating data within an updateable relational view that is constructed over XML data, the method comprising:

identifying the updateable relational view to respond to a SQL update operation, the updateable relational view comprising one or more rows and one or more columns, wherein data within the one or more rows and the one or more columns are populated from underlying XML data that is not stored in a relational format;

receiving an instruction to perform the SQL update operation, wherein the SQL update operation includes an update directed to the updateable relational view rather than to the underlying XML data;

identifying an item of the data for updating in the updatable relational view to implement the SQL update operation, the item of the data corresponding to a node in the underlying XML data;

using a processor to perform the SQL update operation on the item of the data in the updatable relational view; and using a processor to update the node in the underlying XML data to implement the update made to the updateable relational view by the SQL update operation, wherein a reverse lookup is performed on an index table to identify a node address of the node in the underlying XML data corresponding to the item of the data in the updateable relational view, wherein an entry in the index table comprises a column that includes the node address for the node in the underlying XML data.

* * * * *